United States Patent
Tighe

(10) Patent No.: US 6,928,270 B2
(45) Date of Patent: Aug. 9, 2005

(54) WIRELESS COMMUNICATION SYSTEM AND METHOD FOR DELIVERIES

(75) Inventor: Christopher P. Tighe, Arlington, VA (US)

(73) Assignee: The United States of America as represented by the Postal Service, Washington, DC (US)

( * ) Notice: Subject to any disclaimer, the term of this patent is extended or adjusted under 35 U.S.C. 154(b) by 296 days.

(21) Appl. No.: 10/165,812

(22) Filed: Jun. 7, 2002

(65) Prior Publication Data

US 2003/0003936 A1 Jan. 2, 2003

Related U.S. Application Data

(60) Provisional application No. 60/296,106, filed on Jun. 7, 2001.

(51) Int. Cl.⁷ .................................................. H04B 1/38
(52) U.S. Cl. .................. 455/90.1; 455/414.1; 455/406; 455/466; 455/566; 455/557; 455/575.9; 455/345; 705/28; 705/29; 705/406
(58) Field of Search ............................... 455/90.1–90.3, 455/575.1–575.9, 414.1–414.4, 466, 566, 557, 344, 345, 406, 412.1–412.2, 422.1, 426.1, 426.2, 554.1–554.2, 555, 556.1, 556.2; 705/28, 29, 404–410

(56) References Cited

U.S. PATENT DOCUMENTS

| | | | |
|---|---|---|---|
| 5,623,260 | A | 4/1997 | Jones |
| 5,724,243 | A | 3/1998 | Westerlage et al. |
| 5,736,940 | A | 4/1998 | Burgerner |
| RE35,920 | E | 10/1998 | Sorden et al. |
| 6,006,159 | A | 12/1999 | Schmier et al. |
| 6,094,642 | A * | 7/2000 | Stephenson et al. .......... 705/28 |
| 6,411,891 | B1 | 6/2002 | Jones |
| 6,618,668 | B1 * | 9/2003 | Laird .......................... 701/204 |
| 6,753,808 | B2 * | 6/2004 | Lee et al. .............. 342/357.07 |
| 6,801,901 | B1 * | 10/2004 | Ng .............................. 705/28 |

* cited by examiner

Primary Examiner—Charles Craver
(74) Attorney, Agent, or Firm—Lewis and Roca LLP

(57) ABSTRACT

A system and method is provided for providing wireless electronic content to members of the public. A mobile backbone of an electronic content delivery system is based on mobile vehicles, as of the Postal Service. Alternatively a stationary network to deliver electronic content is established in Postal Service facilities. A device, such as a Family Message Board, receives delivery of the wireless electronic content, whether from a mobile vehicle or fixed postal station. The wireless electronic content may be processed for a variety of uses including email, internet access, graphic messages, and postal secure notifications.

28 Claims, 17 Drawing Sheets

WIRELESS COMMUNICATION SYSTEM AND METHOD FOR DELIVERIES

CROSS-REFERENCE TO RELATED APPLICATIONS

This application claims priority from U.S. Provisional Application No. 60/296,106 filed on Jun. 7, 2001, entitled "Apparatus and Methods for Sharing of Information Over A Wireless Network and Customer Communications Unit For Using Same." The contents of the above provisional application is relied upon and expressly incorporated by reference as if fully set forth herein.

STATEMENT REGARDING FEDERALLY SPONSORED RESEARCH OR DEVELOPMENT

The invention was made by an agency of the United States government or under a contract with an agency of the United States government, the United States Postal Service ("USPS" or "Postal Service"), an independent establishment of the executive branch of the U.S. government.

BACKGROUND OF THE INVENTION

1. Field of the Invention

The invention relates generally to a method and system for providing wireless electronic content to members of the public. More particularly, the invention relates to providing a wireless electronic content delivery system based on mobile vehicles, as of the Postal Service. Alternatively a stationary network to deliver electronic content is established in Postal Service facilities. A device, such as a Family Message Board, receives delivery of the wireless electronic content, whether from a mobile vehicle or fixed postal station. The wireless electronic content may be processed for a variety of uses including email, internet access, graphic messages, and postal secure notifications.

2. Description of the Related Art

Current technology for electronic content delivery includes such methods as telephone line delivery, cable line delivery, satellite delivery, and cell phone delivery. Each of these methods are useful, but they all have weaknesses. Telephone and cable connections for electronic content delivery require a wire line or physical connection between the source of the content and the content viewing mechanism. Satellite and cell sources of electronic content delivery do not allow for universal access and have security weaknesses. Current technology for electronic content viewing devices or receivers include such things as computers, telephones, televisions, cell phones and PDAs. However, there is not a customer-friendly device that does not need to be plugged in or hard wired into a wall outlet, and that has the same functionality as the currently existing devices. One problem in particular is that many people cannot use the receivers or devices as a group, the way a family may use a message board on a refrigerator.

There are currently many limitations to wireless technology. In terms of providing universal access, the most critical problem is an inconsistent ability to access a wireless network. Transmission stations which are used to access the network cannot either be placed everywhere because of physical and monetary restrictions. Uncontrollable factors such as weather, geography and population density also affect the ability to create a true universal network.

Accordingly, there is a need for a method and system that provides a source of wireless electronic content through mobile delivery and a versatile means of receiving the wireless electronic content. A Family Message Board device (or similar device) meets the need for a household source or message board, which serves as a content delivery device. The existing art does not meet this need for a variety of reasons. A computer can be used by several members of the household but is not always accessible; it may not be in a central location, it can be quite large, and it may need access to many types of electrical plugs or can tie up phone lines. With a computer, there is no easy way to leave notes that can be electronically accessed from other locations, other than as voice mail messages. Current technology can also have problems with interruption to the transmission of information or a lack of seamless switching between a variety of transmission means. The Family Message Board device solves these problems by being small with a simple wireless connection to the U.S. Postal Service network. By mounting to a refrigerator in a kitchen (for example), the device can be placed in a central often-used place.

SUMMARY OF THE INVENTION

It is an object of the present invention to provide a system and method for sharing information over a wireless network. The solution to these problems involves two things. First, there is provided a mobile backbone for an electronic content delivery system, such as via the U.S. Postal Service vehicles. Second, there is a device, such as a Family Message Board, that receives the electronic content delivery either from a mobile vehicle or fixed postal station, and processes it for a variety of uses.

An electronic content delivery system via the U.S. Postal Service would solve the problem of lack of universal access. First, a communication system is located within each postal vehicle. As a postal vehicle goes on a delivery route, it would transmit and receive electronic content from households along the route. The postal routes could be set routes allowing for targeted delivery to certain homes. Beyond this mobile fleet, there are post office stations with stationary communications systems that would be able to transmit electronic content to the surrounding neighborhood. The communications system would be able to switch between digital wireless communication and low band radio frequencies to transmit electronic content. With this electronic content delivery system, information may be sent in secure packets via wireless or radio frequency from postal delivery trucks or facilities to customers. The transmission of content itself and the content are protected from tampering under Federal Law, as the content is uploaded and/or downloaded into the mobile transmission station.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claim. It is to be understood that both the foregoing general description and the following detailed description are exemplary and explanatory only and are not restrictive of the invention, as claimed. Thus, the present invention comprises a combination of features, steps, and advantages which enable it to overcome various deficiencies of the prior art. The various characteristics described above, as well as other features, will be readily apparent to those skilled in the art upon reading the following detailed description of the preferred embodiments of the invention, and by referring to the accompanying drawings. The accompanying drawings, which are incorporated in and constitute a part of this specification, illustrate embodiments of the invention and, together with the description, serve to explain the principles of the invention.

BRIEF DESCRIPTION OF THE DRAWINGS

For a more detailed description of a preferred embodiment of the present invention, reference will now be made to the accompanying drawings, which form a part of the specification, and wherein.

DETAILED DESCRIPTION OF THE PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1A:
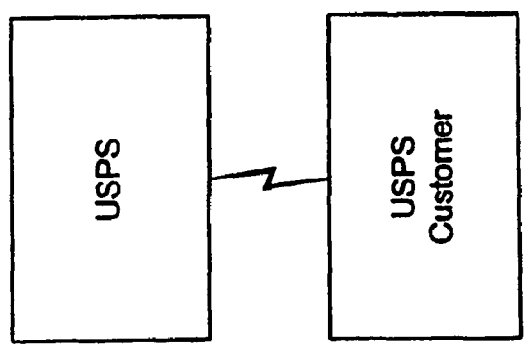
FIG. 1A is schematic overview of the system of the present invention.

FIG. 1A is a simplistic view of the content delivery system. It shows the U.S. Postal Service transmitting wireless content to the U.S. Postal Service customer and vice versa. The content for delivery may be generated by the U.S. Postal Service or it may be downloaded into the U.S. Postal Service system from the internet.

Figure 1B:
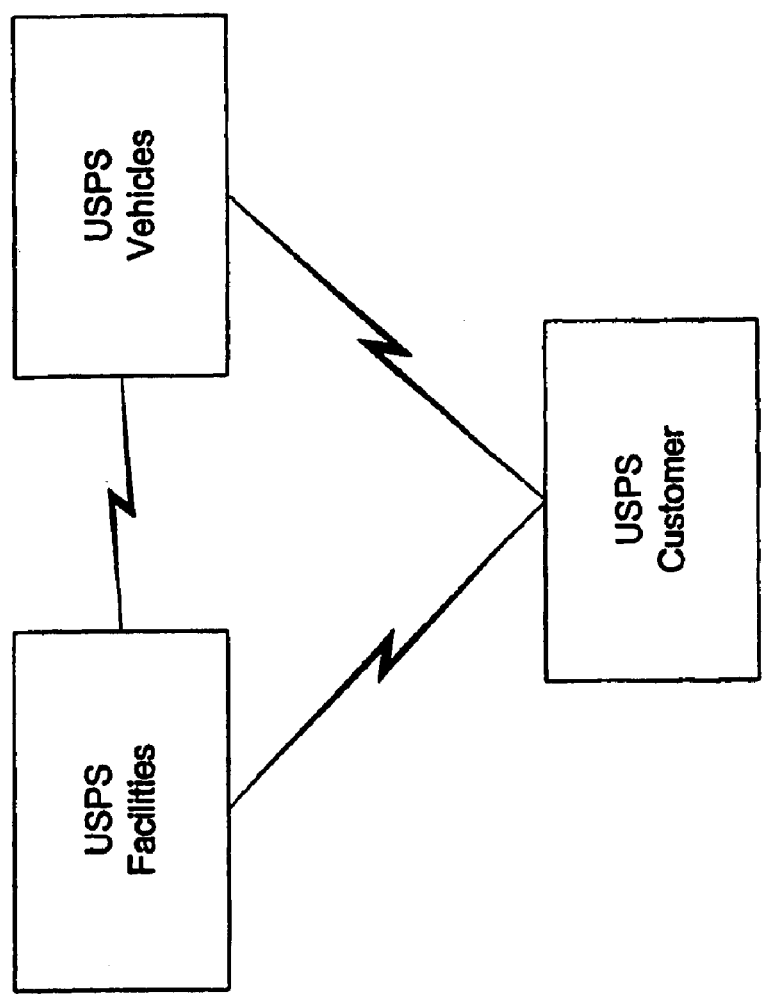
FIG. 1B is also a schematic overview of the system of the present invention.

FIG. 1B shows more detail in an overall view of an electronic content delivery system. It shows U.S. Postal Service facilities, such as post offices and mail processing facilities, transmitting and receiving information from U.S. Postal Service vehicles, such as mail trucks and rural delivery vehicles. Both of these, U.S. Postal Service facilities and U.S. Postal Service vehicles, upload, download, and transmit electronic content to U.S. Postal Service customers and vice versa. Included in the upload to the vehicle may be a request to the system for access to a particular internet location.

In FIG. 1B, there is a wireless network of U.S. Postal Service facilities and vehicles which create a secure wireless network with the customer. The facilities will transmit (i.e., upload and download) content to the vehicles that are specific to the customers on the vehicle's or the carrier's route, and then those vehicles in turn transmit information to the specific customers as they drive along their route. Thus, there is both a hard copy delivery network and a wireless delivery network. For example, it is envisioned that the U.S. Postal Service facilities in FIG. 1B will be able to accept electronic content from business customers, such as large mail houses, advertising agencies, print shops, etc. The U.S. Postal Service would then be able to take the content and transmit it wirelessly to the subscribed customers, either from the U.S. Postal Services facilities and/or from U.S. Postal Services vehicles.

Figure 1C:
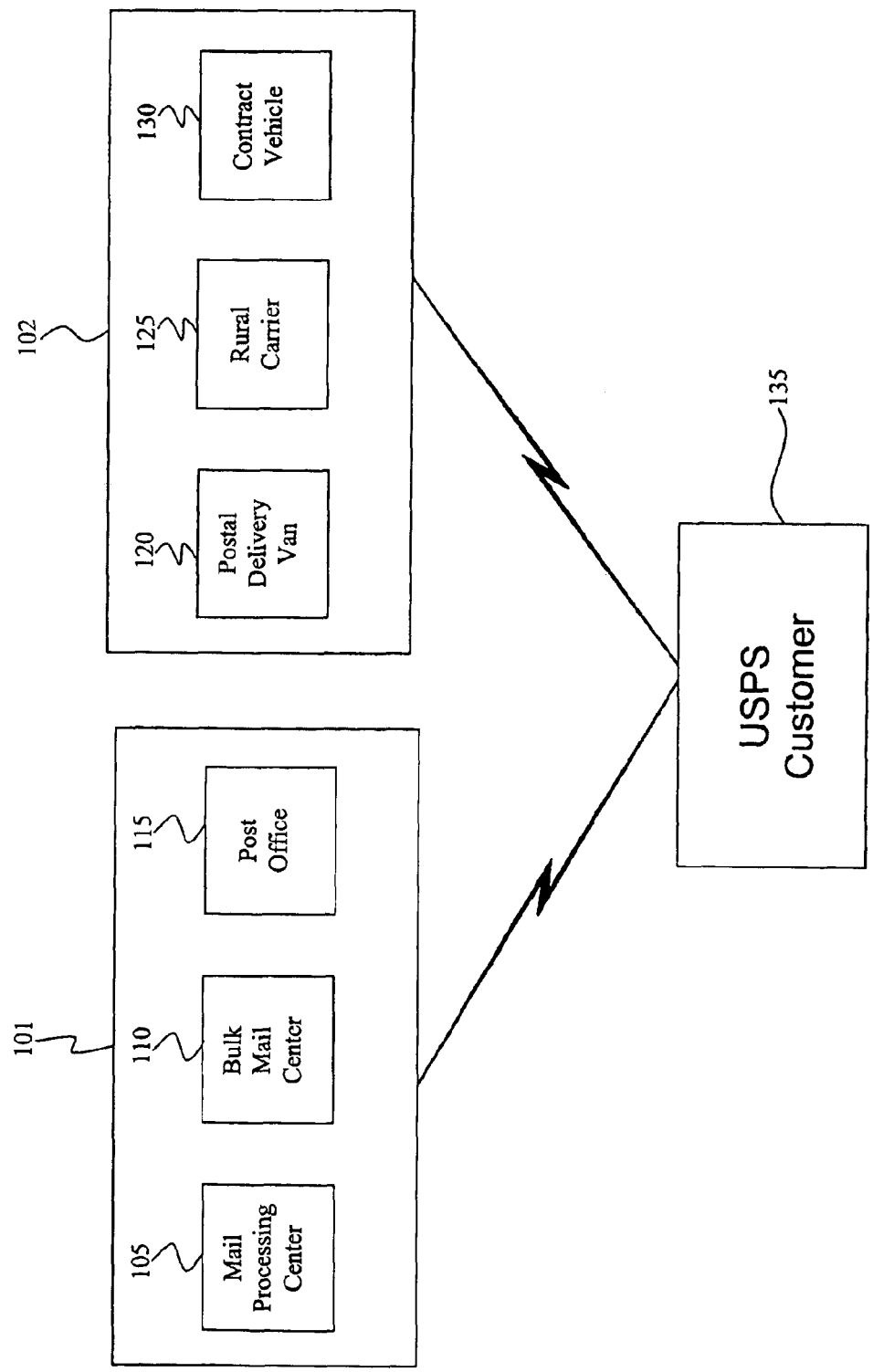
FIG. 1C is a schematic of the system showing providers and facilities for communication.

FIG. 1C shows the different providers and facilities, and different varieties of vehicles that transmit and receive information as part of an electronic content delivery system. FIG. 1C shows several but not all of the types of U.S. Postal Service facilities 101, from a mail-processing center 105 to a bulk mail center 110 to a regular post office 115. In addition, FIG. 1C also shows several but not all of the types of U.S. Postal Service vehicles 102, from a standard postal delivery van 120, a rural carrier 125, and a rural carrier contract vehicle 130. In rural areas, the postal service contracts to rural carriers who use their own private cars under private contract to the U.S. Postal Service. The figure also shows U.S. Postal Service customers 135. There are a variety of postal service customers who receive mail delivery in a variety of ways, from the standard house mailbox to the apartment building cluster boxes. The U.S. Postal Service has a variety of customers and any customer would be able to be part of this system as the system provides for universal access.

Figure 2:
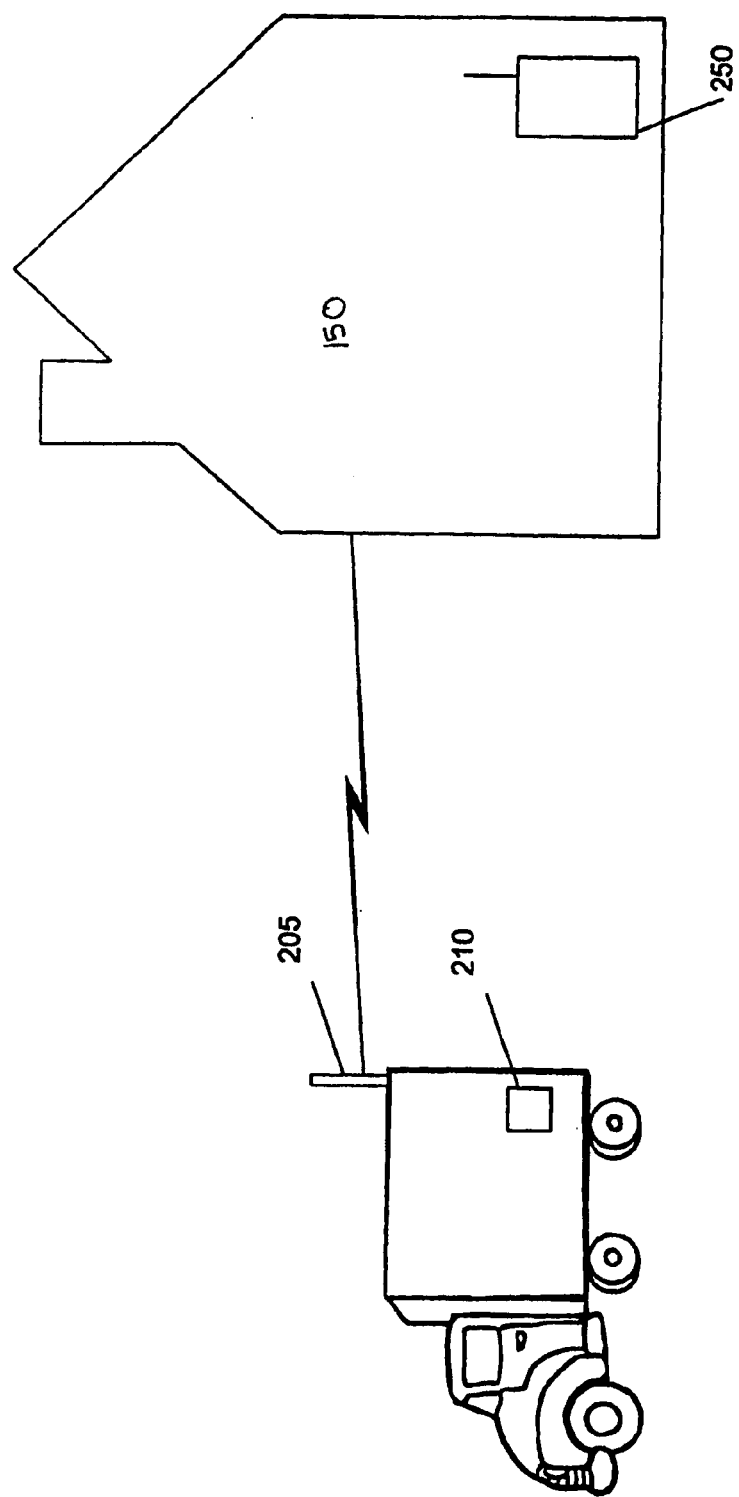
FIG. 2 is a schematic of one embodiment of the present invention.

FIG. 2 shows a house, which is labeled U.S. Postal Service Customer 150, and a truck. FIG. 2 shows one approach of delivery of electronic content to a U.S. Postal Service customer from Postal Service vehicles and/or facilities. The truck symbolizes a U.S. Postal Service delivery vehicle. This can be either a postal service owned truck or a contracted vehicle. The truck has a wireless antenna 205 and a computer 210. The computer 210, produces electronic content that is transmitted through the antenna to the U.S. Postal Service customer. In household 150, there is a Family Message Board unit 250. FIG. 2 also shows a lightning bolt from the truck to the household depicting that as the truck moves through the neighborhood, it may transmit electronic content to the devices within the households and vice versa.

In FIG. 2, one can replace the truck with a postal service facility and it can have the same interaction with the U.S. Postal Service customer. In FIG. 2 the content delivered is not being sent through a third party means, but rather only through U.S. Postal Service vehicles or facilities, and thus is secure. The secure relaying of electronic content from the U.S. Postal Service to the customer can interface with the Family Message Board device or with other commercially developed products.

Figure 3:
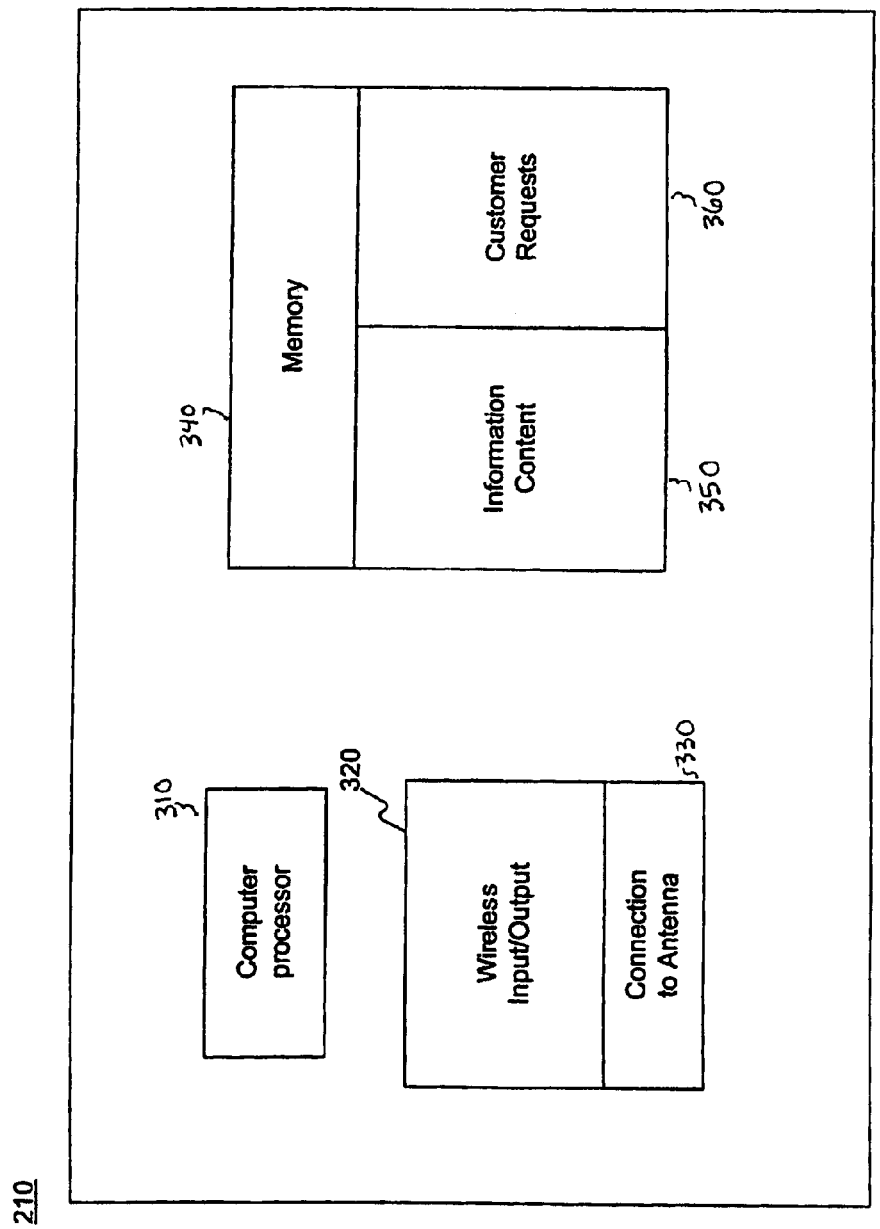
FIG. 3 is a schematic presentation of a computer of the present invention.

FIG. 3 depicts computer 210 of FIG. 2, the computer that was either in the postal service facility and/or the postal service vehicle. Computer 210 includes a variety of elements. There is a computer processor 310, a wireless input-output transmitting device 320 with a connection for a wireless antenna 330, and a memory that will hold information content and customer requests. Computer 210 may also include other components such as memory 340, that may include information content 350, and customer requests 360.

Figure 4:
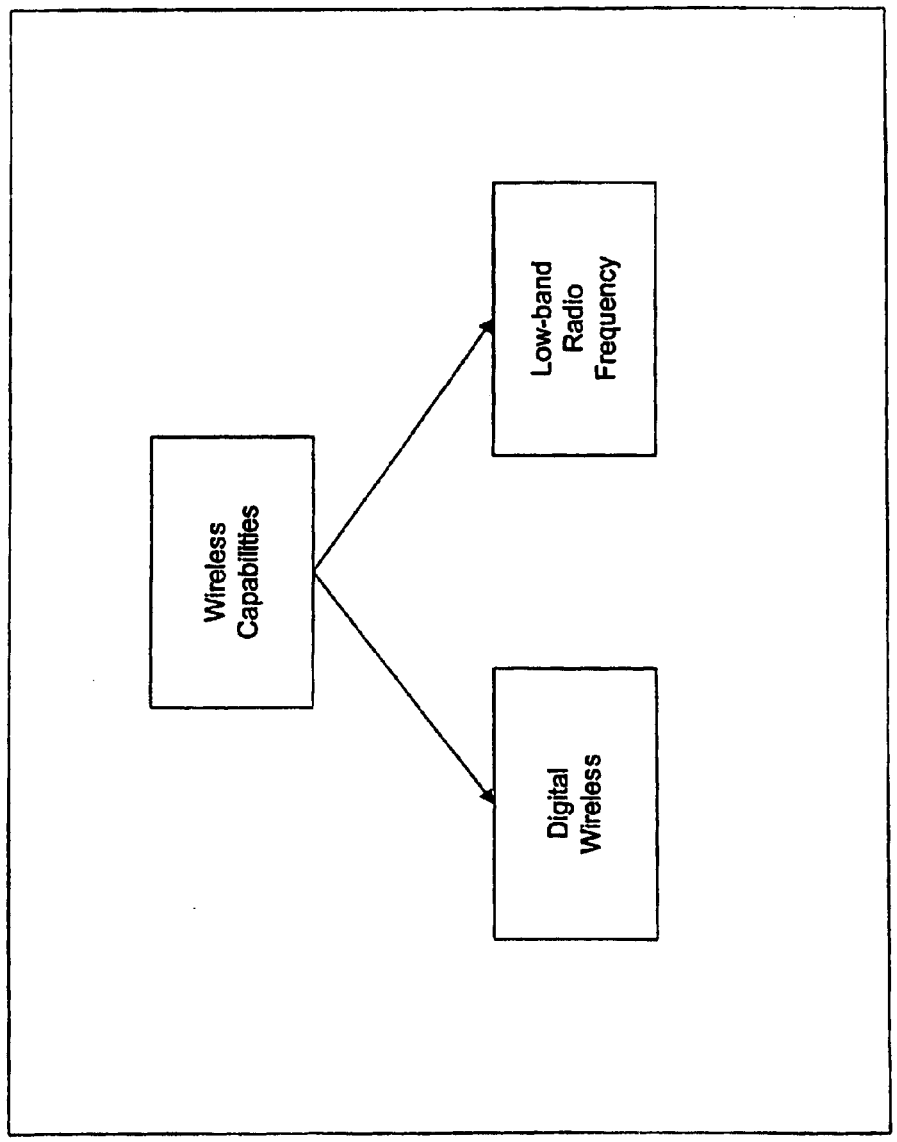
FIG. 4 is a schematic view of wireless input-output of the computer of the present invention.

FIG. 4 shows the wireless input-output portion of the computer which was shown in FIG. 3. Element 320 is comprised of components combined in a unique way. The wireless capabilities include digital wireless or low band radio frequency, or both. Thus, the device can transmit electronic content wirelessly, using either digital wireless, and/or low band radio frequency. With the ability to transmit in two different ways, if one of those ways, such as digital wireless does not work or there is interference, the alternate system is used.

Family Message Board Device for Using Content Delivery System

Figure 5A:
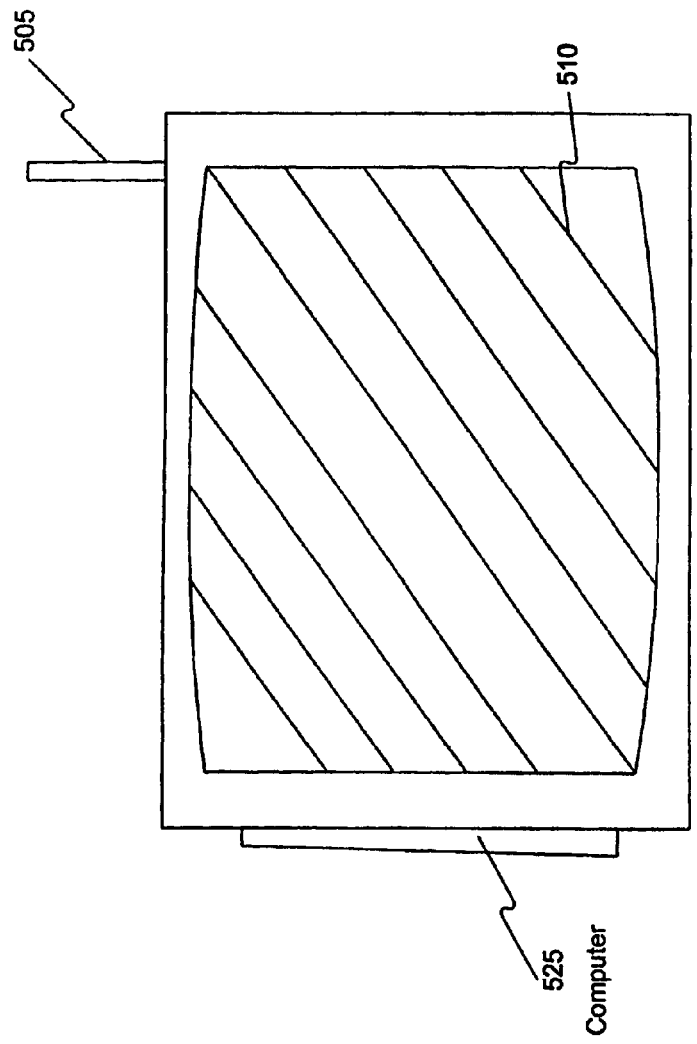
FIG. 5A is a schematic view of a family message board.

FIG. 5A shows a simplified representation of the Family Message Board. The Family Message Board was originally depicted in FIG. 2 as device 250. FIG. 5A shows some of the basic elements of the Family Message Board. Element 525 is a computer which is housed within device 250. Element 510 is a standard touch screen, which displays information and is the interface for the user. Optionally, the unit could have a screen saver or a screen cover to protect the screen. If the unit is on all the time, a screen saver could be used. Element 505 is a wireless antenna.

FIG. 5A depicts one mode of operation, using elements 505, 510, and 525, as previously explained. For input into the device, there are many alternatives. For example, a keyboard could be used instead of the touch screen. For data transmission, there are also many alternatives. Instead of a wireless antenna, device 250 could use wire line or other data transmission means. In addition, there are a variety of computers that could be used within device 250. Thus, FIG. 5A represents one of many possible modes of operation.

Figure 5B:
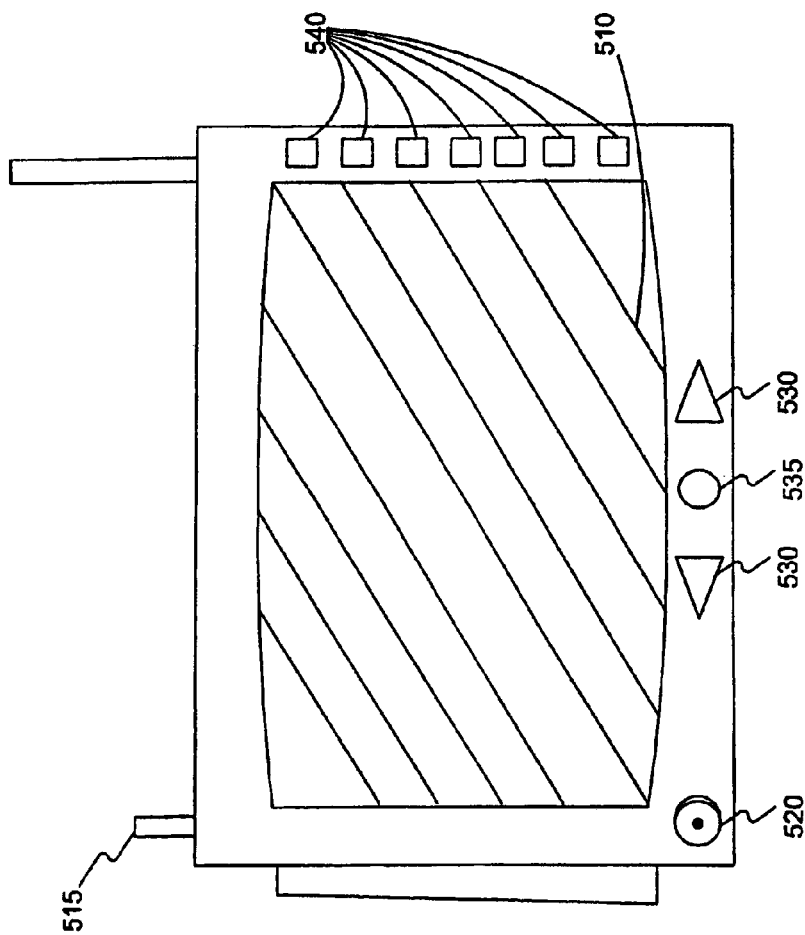
FIG. 5B is a detailed view of an embodiment of a family message board.

FIG. 5B provides a detailed view of some of the optional elements of device 250. Beyond the elements in FIG. 5A, there arc optional enhancements, as shown by elements 515, 520, 530, 535, 510, and 540. Element 515, is a stylus, such as a stylus pen, with a holder. This pen can be used to write a message on the Family Message Board or to touch parts of the screen. Element 520 is an infra-red detector or IR port, which enables the device 250 to download and/or upload information to or from either a wireless device, such as a cell phone or a PDA, or any other device that transmits information via an infra-red port. Both stylus 515 and IR port 520 may be used in a variety of applications. Element 530 includes forward and backward buttons, which are used to scroll forward and backwards through either viewing screens or through different software elements within the device. Element 535 is a ball, such as a roll ball, mouse, guide or track ball, which would allow the user to move a cursor around the screen, just as one does now on a standard computer. Element 510 is a touch screen, although another option is to have a non touch sensitive screen instead. In one implementation, element 510 is a flat screen, however, other types of displays can be used. Element 540 is a set of huttons on the side of the device 250 which allows the user to choose different applications in the device 250 and can be linked to different commands within the operating system software on the device 250. Within FIG. 5B, all the elements can be placed anywhere within or on the device 250.

Figure 5C:
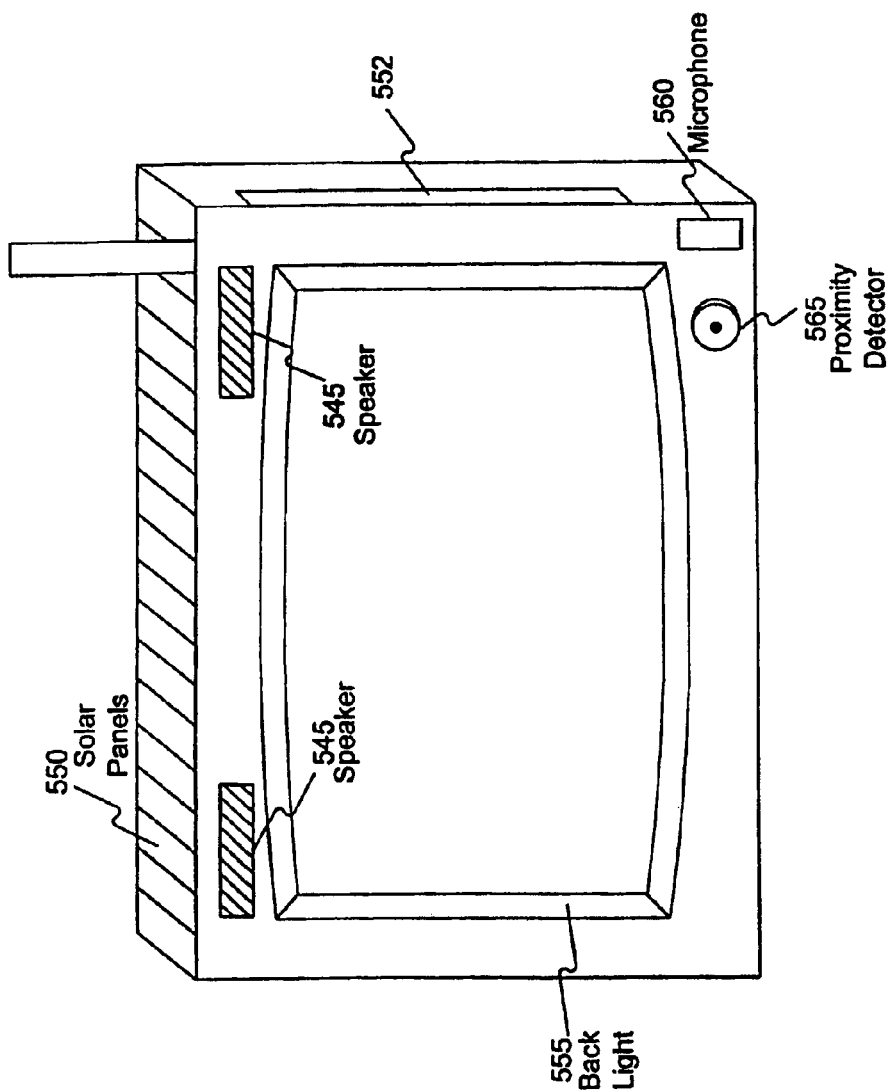
FIG. 5C is a detailed view of a further embodiment of a family message board.

FIG. 5C shows more optional elements of device 250, including elements 550, 545, 552, 555, 560, and 565. Element 550 is a solar energy panel. Element 550 depicts a solar panel which can power the device 250 using artificial and/or natural light. Solar panels 550 can be placed anywhere on the device 250. Element 552 depicts a rechargeable power source which obtains power from solar panel 550 or any other energy source, and element 552 can store energy for later use. Thus, device 250 can be powered by more conventional means, such as Through an electrical outlet or batteries. Element 545 includes one or more speakers. Speakers 545 include digital speakers or other types of speakers. Speakers 545 can be placed anywhere on device 250. Element 555 is a backlighting device which illuminates the screen 510 in the low light and/or dark conditions. This is a standard light source that is found on many devices, such as cell phones and PDAs. Element 560 is a microphone. This microphone enables device 250 to record verbal and/or sound messages. Element 565 is a button that works as both a proximity detector and an on/off switch. It can be implemented as two distinct elements or as one integrated element. For the proximity detection functionality, it would cause device 250 to turn the screen 510 on when a person comes near the device 250 and to turn off the device 250 when ii has riot been used for a set time. For the on/off function, pressing the button would turn the device screcn 510 on or off. All of these elements can be placed anywhere on the device 250 and do not necessarily have to be where they are depicted in the FIG. 5C. Any or all of the elements that are depicted in FIGS. 5B and 5C can be incorporated into device 250.

Figure 6:
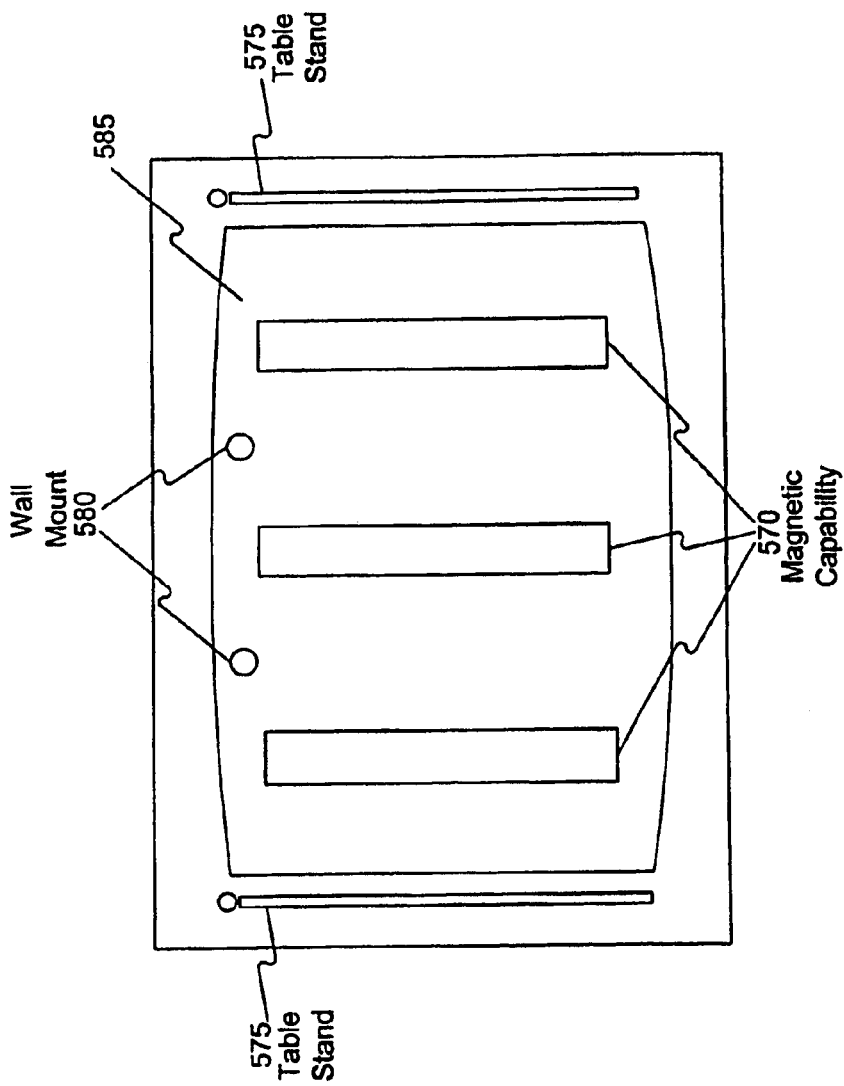
FIG. 6 is a rear view of a further embodiment of a family message board.

FIG. 6 shows optional elements that are on the back or bottom of the device 250 numbered 575, 570, 580, and 585. Element 570 is a magnetic component which enables the device 250 to he mounted on a metal surface, like a refrigerator. Element 575 is a table stand, so the device 250 can be put upon a table instead of a wall surface. Element 580 depicts a wall mount that enables the device 250 to be mounted on the wall, by a means other than magnetic means. Element 585 depicts shielding which would prevent the magnetic fields from the magnets from interfering with the operation of device 250 and with the internal memory of the device 250. The elements 580, 575, 585, and 570 can be placed anywhere on the back or bottom of the device 250 and do not need to appear exactly as they appear in FIG. 6.

FIG. 5C shows more optional elements of device 250, including elements 550, 545, 555, 560, and 565. Element 550 is a solar energy panel. Element 550 depicts a solar panel which can power the device using artificial and/or natural light. Solar panels 550 can be placed anywhere on the device. Element 552 depicts a rechargeable power source which obtains power from solar panel 550 or any other energy source, and element 552 can store energy for later use. Thus, device 250 can be powered by more conventional means, such as through an electrical outlet or batteries. Element 545 includes one or more speakers. Speakers 545 include digital speakers or other types of speakers. Speakers 525 can be placed anywhere on device 250. Element 555 is a backlighting device which illuminates the screen in the low light and/or dark conditions. This is a standard light source that is found on many devices, such as cell phones and PDAs. Element 560 is a microphone. This microphone enables device 250 to record verbal and/or sound messages. Element 565 is a button that works as both a proximity detector and an on/off switch. It can be implemented as two distinct elements or as one integrated element. For the proximity detection functionality, it would cause device 250 to turn the screen on when a person comes near the device and to turn off the device when it has not been used for a set time. For the on/off function, pressing the button would turn the device screen on or off. All of these elements can be placed anywhere on the device and do not necessarily have to be where they are depicted in the FIG. 5C. Any or all of the elements that are depicted in FIGS. 5B and 5C can be incorporated into device 250.

FIG. 6 shows optional elements that are on the back or bottom of the device, numbered 575, 570, 580, and 585. Element 570 is a magnetic component which enables the device to be mounted on a metal surface, like a refrigerator. Element 575 is a table stand, so the device can be put upon a table instead of a wall surface. Element 580 depicts a wall mount that enables the device to be mounted on the wall, by a means other than magnetic means. Element 585 depicts shielding which would prevent the magnetic fields from the magnets interfering with the operation of device 250 and the internal memory of the machine. The elements 580, 575, 585, and 570 can be placed anywhere on the back or bottom of the device and do not need to appear exactly as they appear in FIG. 6.

Figure 7:
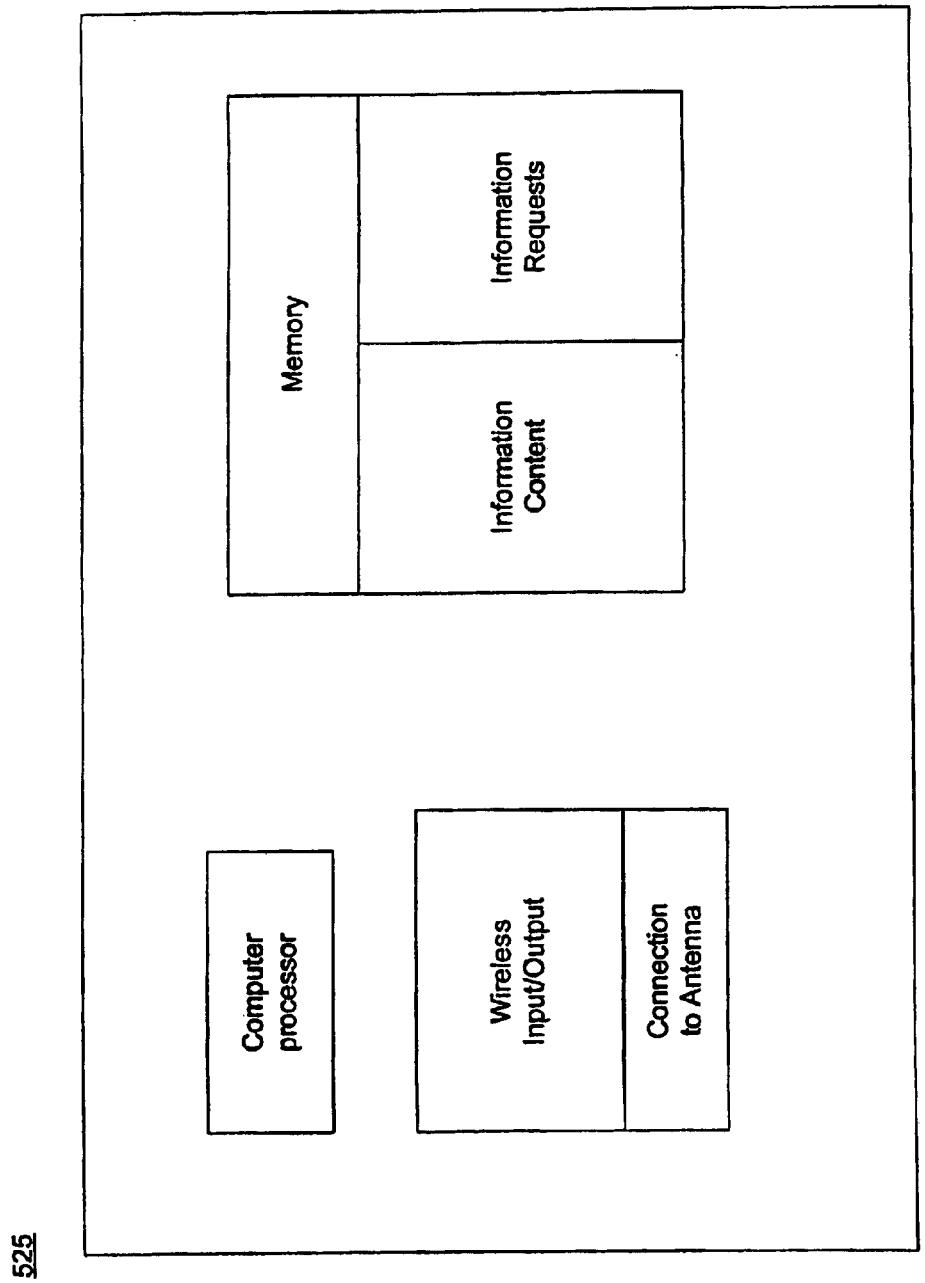
FIG. 7 is a schematic view of the computer in a family message board.

FIG. 7 shows computer 525 from FIG. 5A in more detail. This is similar to the computer described in FIG. 3. Computer 525 includes a variety of elements. There is a computer processor, a wireless input-output transmitting device with a wireless antenna, and a memory that will hold information content and customer requests. Computer 525 may also include other components.

Device 250 could be built in any size or shape. The device should be big enough to allow easy viewing and thin enough for easy mounting and placement. One set of dimensions of the device could be 12 inches tall by 12 inches wide by an half inch thick. This would enable the device to be relatively small, enable the device to be mounted easily, and would also enable the device not to be in the way of any other operations within the household. It would also be less obtrusive than many of the consumer products currently in the market place.

Methods of Operation

Figure 8:
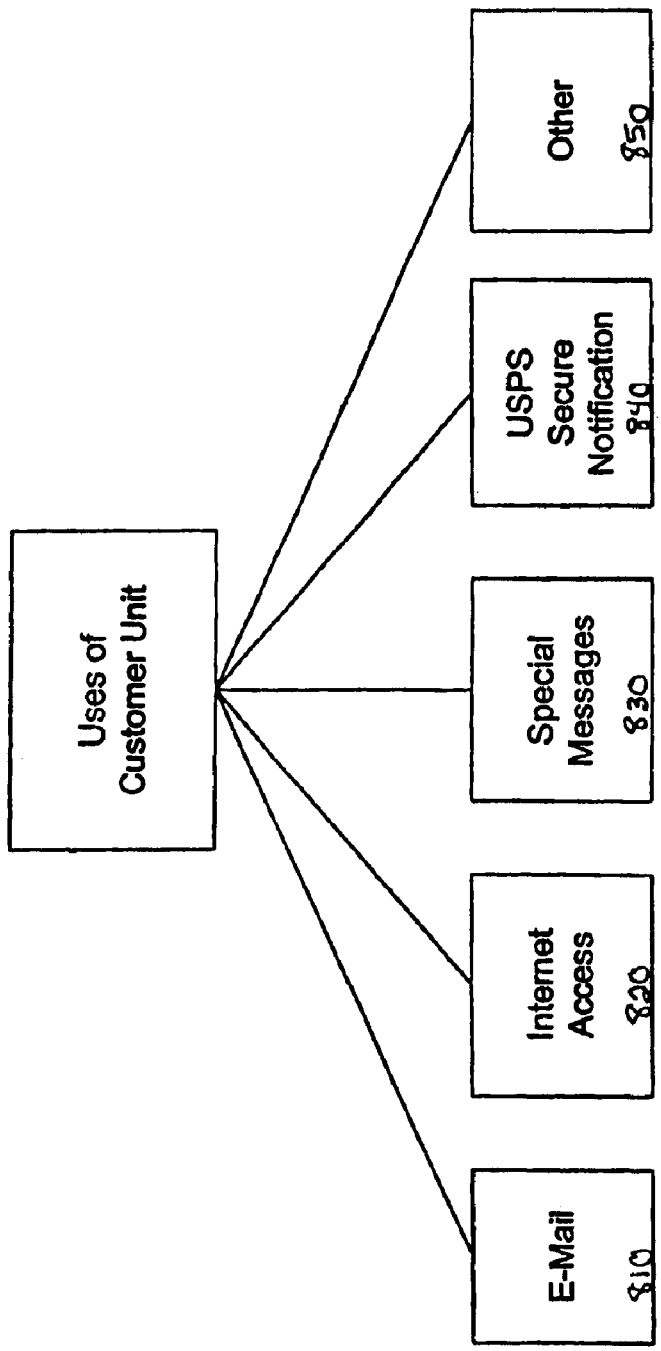
FIG. 8 is a schematic view of the functionality of the present invention.

FIG. 8 provides an overview of the applications of device 250, the customer unit. These applications include e-mail 810, internet access 820, special messages 830, U.S. Postal Service Secure Notification 840 and other uses 850. The use of some of the options are common electronic communications, e.g., e-mail and internet access. In order to use some of these options, i.e. special messages or U.S. Postal Service secured notification, the U.S. Postal Service customer would need to opt-in to the option.

Figure 9:
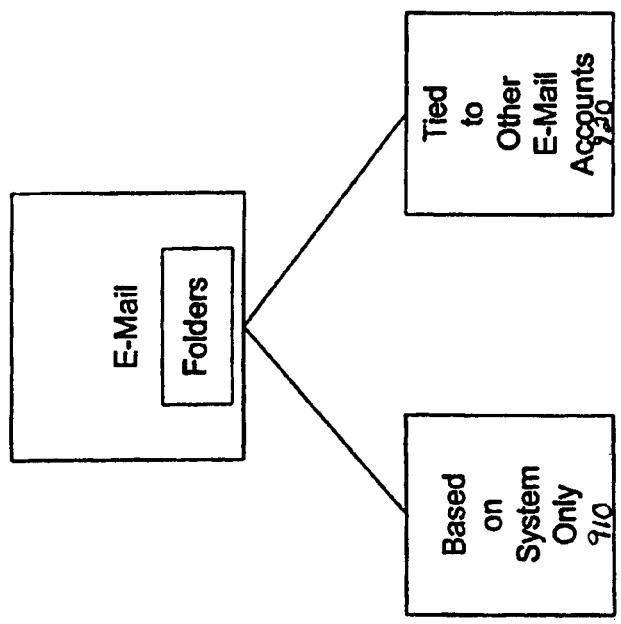
FIG. 9 is a schematic view of the email functionality of the present invention.

FIG. 9 provides more detail on the use of e-mail. The use of e-mail could be, but is not limited to, an e-mail account that is based on the electronic content delivery system 910. The customer unit, or device 250, could have a unique e-mail address.

Another option is to tie the customer unit to other email accounts 920, including forwarding messages from other accounts. The email software at the customer unit may have specific folders such as an inbox, trash, messages sent, etc.

Figure 10:
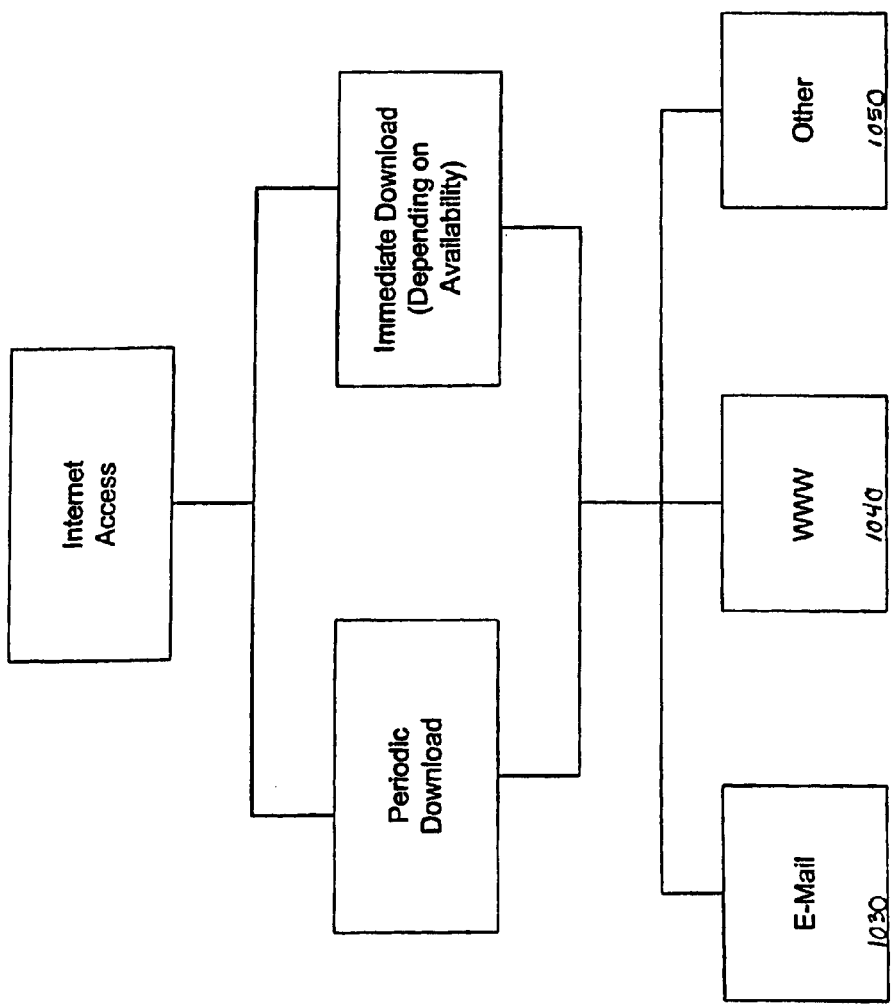
FIG. 10 is a flowchart of the internet access functionality of the present invention.

FIG. 10 provides more detail on internet access. In FIG. 10, internet access flow includes two types of use, periodic download 1010 and immediate download 1020. In periodic download, the user has the ability to download and/or upload content at specific time intervals. A periodic download may be necessary, if there is not a continual available source for internet access. For example, the user could program the device to refresh the memory at a specific time, such as, two o'clock in the morning, or whenever the user has internet access. In immediate download, the user has the ability to download and/or upload content at all times. Immediate download depends on availability, but if digital access or radio frequency access through the U.S. Postal Service is available, the user could connect to the internet at any time using the device. However, constant use may or may not be an option in all areas. Internet access provides for accessing email 1030, the world wide web 1040, and other uses 1050 such as connecting to different types of information content such as, Gopher Systems, and/or other types of information content protocols.

Figure 11:
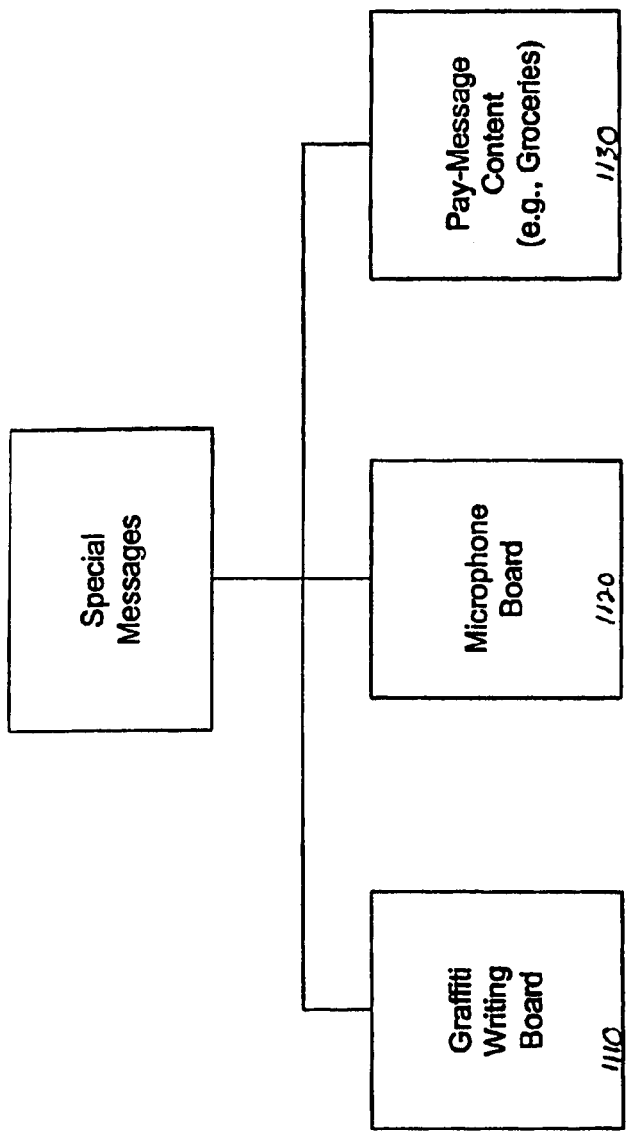
FIG. 11 is a schematic view of special messages functionality of the present invention.

FIG. 11 provides more detail on special messages. Special messages include but are not limited to three types of message relaying systems. One type of message system is a graffiti writing board 1110, like those available on handheld PDAs, which enables the user of the device to write a message on the touch screen. Another type of message system is a microphone board 1120. The microphone board is a voice message system, where a user records a message to be accessed later, either by the user or someone else. Another type of message system is pay message content 1130. Pay message content is an option where companies and/or businesses would send advertising mail and/or messages to the consumer in an opt-in mode that would be displayed on the Family Message Board. As an example, instead of receiving pizza coupons via a hard copy mail, a company could provide those same coupons electronically to the consumer. The consumer could also use the feature to securely order items from a business. This would be part of an opt-in program where a customer could choose to receive and send electronic requests through the Family Message Board. By choosing to participate, the consumer could access local businesses like a grocery store. The customer could send an order to the grocery store for groceries and then have them waiting for them at a particular time. In turn the grocery store could inform the customer of sales or promotions. This local opt-in access program would provide a valuable service to the community.

Figure 12:
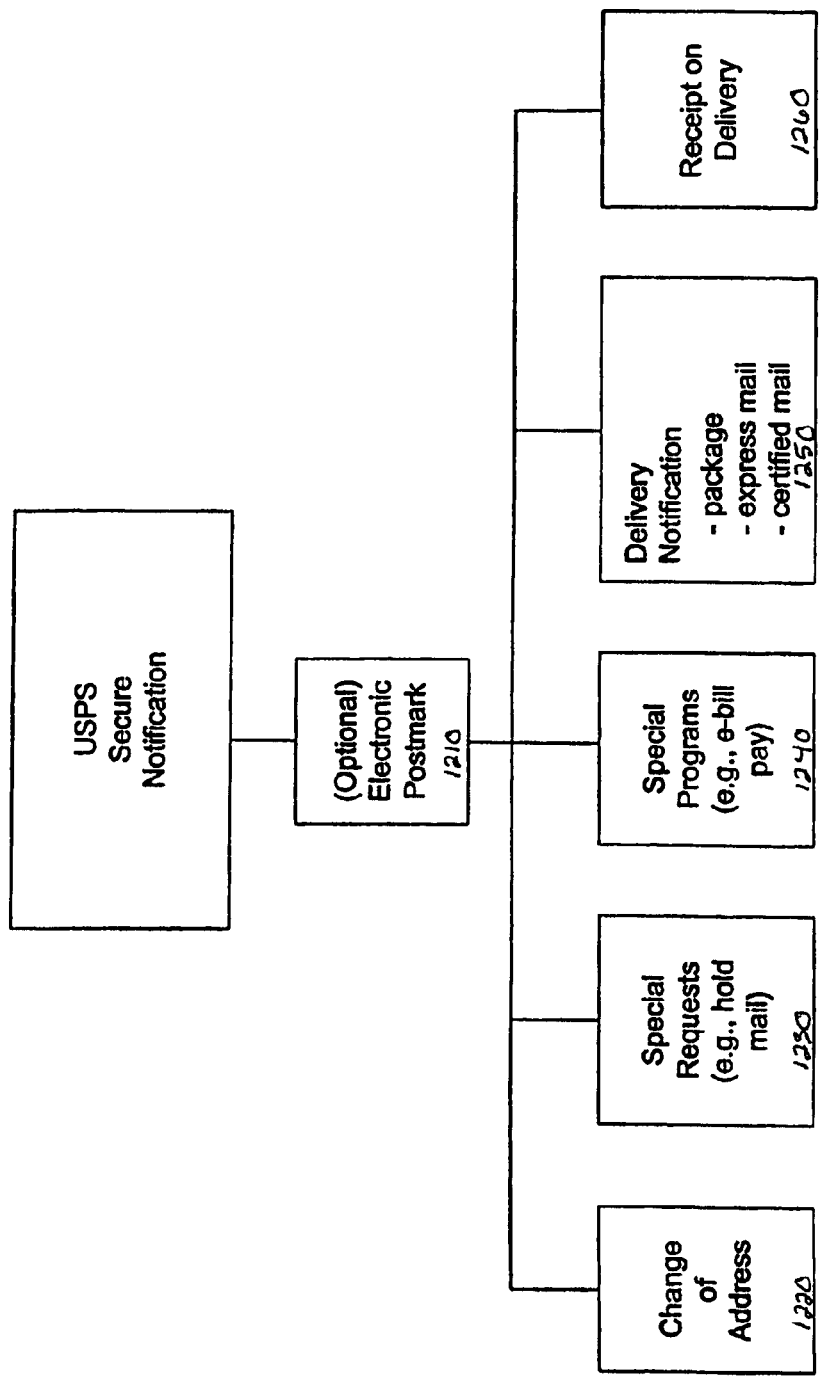
FIG. 12 is a schematic view of secure notification functionality of the present invention.

FIG. 12 provides more detail on Secure Notification. Secure Notification uses special protocols that are unique to the U.S. Postal Service and unique to the device, such as an electronic postmark 1210.

Within Secure Notification, the customer could change their address 1220, transmit a special request to the postal service 1230 (for example, a request to hold mail), and could transmit information on special programs 1240 (for example, eBill Pay). A delivery notification 1250 feature could be included. This could help with the current problem that, in order for the U.S. Postal Service to deliver a package to a household, a member of the household must be present to accept that package. Depending on security of the neighborhood, the U.S. Postal Service will leave a slip of paper on the customer's door. The customer then either has to sign the paper and describe where they want their package left or they have to go physically to a post office location, present the slip, and then accept the package. In contrast, delivery notification from the U.S. Postal Service would electronically link a physical address to an electronic address. It would send to the electronic address notification regarding a package. The user could send back to the postal service instructions on what to do with the package. Then the package would be delivered per the instructions. The delivery notification option would also enable the user to sign for delivery of express mail and/or certified mail using an electronic signature. These are just some of many examples of different options of delivery notification. Electronic receipts 1260 for delivery of items is another option. When a user accepts a package, a receipt for the delivery of a parcel or a product could be sent to the sender, with signature confirmation and/or delivery confirmation.

Figure 13:
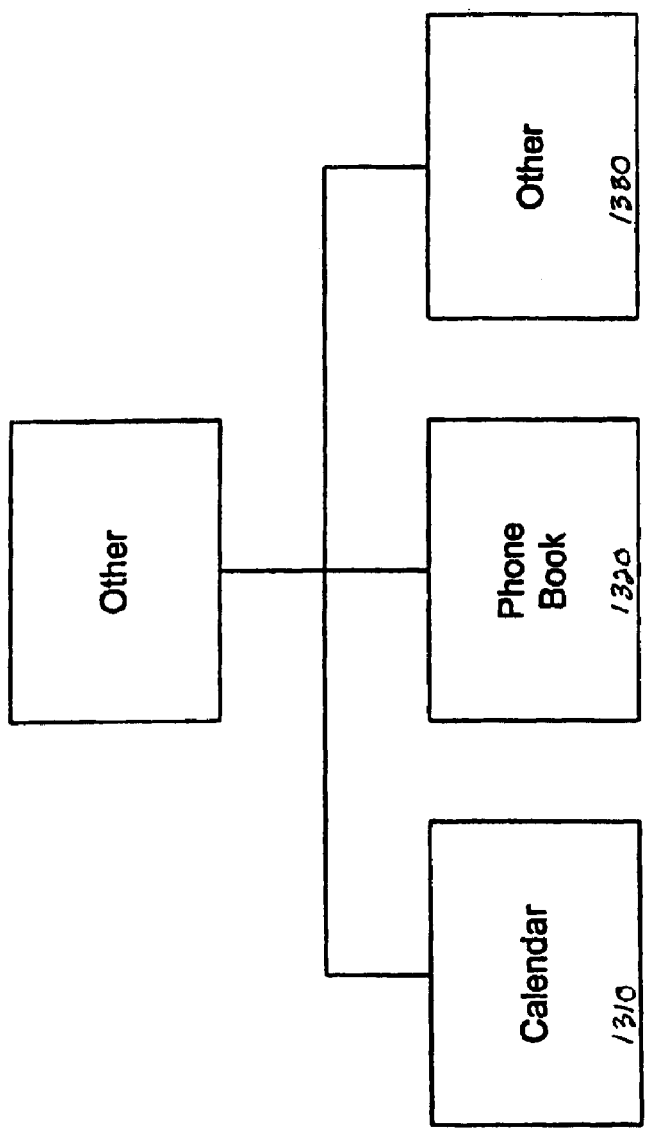
FIG. 13 is a schematic view of optional uses functionality of the present invention.

FIG. 13 provides more detail on other optional uses of the customer unit. Other options include an electronic calendar 1310 or digital calendar, a phone book/address book 1320, as well as other options 1330. These uses may be performed by any software application that the user could use within this device, such as a software program for cooking or an index of recipes. One skilled in the art would be aware of other uses for the apparatus and methods described herein.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. One of ordinary skill in the art will recognize that the process just described may easily have steps added, taken away, or modified without departing from the principles of the present invention. Accordingly, the scope of protection is not limited to the embodiments described herein, but is only limited by the claims which follow, the scope of which shall include all equivalents of the subject matter of the claims.

What is claimed is:

1. A method of providing wireless electronic communication comprising:

locating a wireless communication system within a mobile postal vehicle wherein said wireless communication system is capable of receiving and transmitting electronic data;

locating a wireless communication system within a stationary postal facility wherein said wireless communication system is capable of receiving and transmitting electronic data;

transmitting electronic data from a mobile postal vehicle to a family message board device including a wireless communication system capable of receiving and transmitting electronic data;

transmitting electronic data from a stationary postal facility to said family message board device;

receiving electronic data from said family message board;

transmitting electronic data from said stationary postal facility to said mobile postal vehicle; and transmitting the same electronic data from said mobile postal vehicle to said family message hoard.

2. The method of claim 1, further comprising transmitting electronic data from said mobile postal vehicle to said stationary postal facility.

3. The method of claim 1, wherein the electronic data received from said family message board comprises electronic data received by either said stationary postal facility or by said mobile postal vehicle.

4. A method of providing wireless electronic communication comprising:

locating a wireless communication system within a mobile postal vehicle wherein said wireless communication system is capable of receiving and transmitting electronic data;

locating a wireless communication system within a stationary postal facility wherein said wireless communication system is capable of receiving and transmitting electronic data;

transmitting electronic data from a mobile postal vehicle to a family message board device including a wireless communication system capable of receiving and transmitting electronic data;

transmitting electronic data from a stationary postal facility to said family message board device;

receiving electronic data from said family message board;

receiving electronic data from said family message board by a mobile postal vehicle; and receiving the same electronic data from said mobile postage vehicle by said stationary postal facility.

5. The method of claim 4 further comprising transmitting electronic data from said stationary postal facility to said mobile postal vehicle.

6. The method of claim 4 wherein the electronic data received from said family message board comprises electronic data received by either said stationary postal facility or by said mobile postal vehicle.

7. A system comprising:

a stationary warehouse containing parcels for delivery to respective parcel receipt facilities; and a mobile vehicle containing parcels from the warehouse and identified for delivery to respective said parcel receipt facilities, wherein the warehouse and the vehicle have respective wireless communication systems for performing a method comprising:

wirelessly transmitting first electronic data from the warehouse addressed for receipt by the vehicle and identifying one said parcel contained in the vehicle for delivery to one said parcel receipt facility;

wirelessly receiving, at the vehicle, the wireless transmission of the first electronic data;

wirelessly transmitting, from the vehicle, the first electronic data addressed for wireless receipt and output at an computing device having a wireless communication system at the one said parcel receipt facility;

receiving a wireless transmission at the vehicle, addressed for receipt at the vehicle from the computing device, and containing second electronic data acknowledging receipt of the first electronic data at the computing device;

wirelessly transmitting the second electronic data from the vehicle addressed for wireless receipt at the warehouse; and receiving, at the warehouse, a wireless transmission from the vehicle and containing the second electronic data.

8. The method of claim 7, wherein:

the stationary package delivery warehouse is a stationary postal facility; and said mobile parcel delivery vehicle is selected from the group consisting of a postal delivery van, a rural carrier, and a contracted rural carrier private car.

9. The method of claim 7, wherein said computing device comprises a computer, a touch screen, a wireless antenna, and a keyboard.

10. The method of claim 9 wherein;

said computing device further comprises a wireline connection; and the input device is selected from the group consisting of, a stylus pen, an infrared port, a forward button, a backward button, a roll, and combinations thereof.

11. The method of claim 9, wherein:

said computing device further comprises one of more functional components selected from the group consisting of a solar energy panel, a rechargeable power source, at least one speaker, and a proximity detector;

the input device comprises a microphone; and the display screen further comprises a backlighting device.

12. The method of claim 11 wherein said proximity detector further comprises an on/off switch for the computing device.

13. The method of claim 7 wherein said computing device comprises at least one functionality from the group consisting of email, internet access, and special messages.

14. The method of claim 13 wherein said email function is selected from the group consisting of system email and outside email accounts.

15. The method of claim 13, wherein said internet access functionality is selected from the group consisting of a periodic download, and an immediate download.

16. The method of claim 13, wherein said special messages functionality are selected from the group consisting of graffiti writing board, microphone board, and pay-message content.

17. The method of claim 7, wherein:
said computing device further comprises functionality for secure notification; and
the input further comprises data selected from the group consisting of a change of address request, a mail request, a request for an e-bill pay, a request to withhold the delivery of a parcel, a request related to express mail, a request related to certified mail, a receipt on delivery of a parcel, and combinations thereof.

18. The method of claim 17 wherein said input further comprises a request related to an electronic postmark.

19. The method of claim 7 wherein said computing device includes the functionality of an electronic calendar and phone book.

20. The system as defined in claim 7, wherein:
the first electronic data represents a notification of an intended delivery of the one said parcel to the one said parcel receipt facility; and
the second electronic data further comprises instructions for the delivery of the one said parcel to the one said parcel receipt facility.

21. The system as defined in claim 7, wherein:
the first electronic data further comprises a request for an electronic signature; and
the second electronic data further comprises the electronic signature.

22. The system as defined in claim 7, wherein the method further comprising:
wirelessly transmitting third electronic data from the warehouse addressed for wireless receipt and output by the computing device; and
receiving a wireless transmission at the warehouse, addressed for delivery at the warehouse from the computing device, and containing fourth electronic data.

23. A method comprising:
wirelessly receiving first electronic data in a first transmission addressed to a computing device having a wireless communication system used at a parcel receipt facility at which parcels are delivered by a mobile parcel delivery vehicle; wherein:
the computing device includes a display screen, an input device; and secured notification functionality;
the first transmission is addressed and wirelessly transmitted from the mobile parcel delivery vehicle;
the first electronic data is transmitted to the mobile parcel delivery vehicle from a stationary warehouse from which the parcels in the vehicle came;
the mobile vehicle contains at least one parcel from the warehouse that is identified for delivery to the parcel receipt facility;
rendering a display of the first electronic data on the display screen;
receiving input, from the input device, for the secured notification functionality and selected from the group consisting of:
an acknowledgment of the receipt of the first electronic data at the computing device;
a change of address request;
a mail request;
a request for an e-bill pay,
a request to withhold the delivery of a parcel;
a request related to express mail;
a request related to certified mail;
a receipt on delivery of a parcel;
a request related to an electronic postmark; and
combinations thereof;
transforming the input at the computing device into second electronic data; and
wirelessly transmitting the second data from the computing device addressed to be received by the mobile vehicle for subsequent delivery by the mobile vehicle in a second
transmission addressed to the warehouse.

24. The method as defined in claim 23, wherein:
the first electronic data represents a notification of an intended delivery of one said parcel in the vehicle to the parcel receipt facility; and
the second electronic data further comprises instructions for the delivery of the one said parcel in the vehicle to the parcel receipt facility.

25. The method as defined in claim 23, wherein:
the first electronic data further comprises a request for an electronic signature; and
the second electronic data further comprises the electronic signature.

26. The method as defined in claim 23, wherein the method further comprising:
wirelessly receiving, at the computing device, third electronic data in a third transmission addressed to and for output by the computing device and addressed from the warehouse; and
wirelessly transmitting, from the computing device, fourth electronic data in a fourth transmission addressed to the warehouse.

27. The method as defined in claim 23, wherein each of the first and second transmissions and at least a portion of the content therein are protected from tampering under United Stated Federal Law as related to the US Postal Service.

28. A computer-readable medium comprising instructions that, when executed by a computer, perform the method of claim 23.

* * * * *

UNITED STATES PATENT AND TRADEMARK OFFICE
CERTIFICATE OF CORRECTION

| | | |
|---|---|---|
| PATENT NO. | : 6,928,270 B2 | Page 1 of 1 |
| APPLICATION NO. | : 10/165812 | |
| DATED | : August 9, 2005 | |
| INVENTOR(S) | : Christopher P. Tighe | |

It is certified that error appears in the above-identified patent and that said Letters Patent is hereby corrected as shown below:

In column 5, line 59, "huttons" should be changed to --buttons--; and at line 40, "arc" should be changed to --are--.
In column 6, line 7, "Through" should be changed to --through--.
In column 9, line 45, "hoard" should be changed to --board--.
In column 10, line 57, "of," should be changed to --of--; and at line 61, "one of more" should be changed to --one or more--.

Signed and Sealed this

Twenty-seventh Day of February, 2007

JON W. DUDAS
*Director of the United States Patent and Trademark Office*